US009503605B2

(12) United States Patent
Sugiyama et al.

(10) Patent No.: US 9,503,605 B2
(45) Date of Patent: Nov. 22, 2016

(54) IMAGE READER, AND METHOD AND COMPUTER-READABLE MEDIUM THEREFOR

(71) Applicant: BROTHER KOGYO KABUSHIKI KAISHA, Nagoya-shi, Aichi-ken (JP)

(72) Inventors: Kentaro Sugiyama, Gifu (JP); Takeshi Kuno, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/620,564

(22) Filed: Feb. 12, 2015

(65) Prior Publication Data

US 2015/0229810 A1  Aug. 13, 2015

(30) Foreign Application Priority Data

Feb. 13, 2014 (JP) ................. 2014-025175

(51) Int. Cl.
*H04N 1/46* (2006.01)
*H04N 1/10* (2006.01)
*H04N 1/12* (2006.01)
*H04N 1/407* (2006.01)

(52) U.S. Cl.
CPC ............ *H04N 1/1017* (2013.01); *H04N 1/125* (2013.01); *H04N 1/4076* (2013.01)

(58) Field of Classification Search
None
See application file for complete search history.

(56) References Cited

U.S. PATENT DOCUMENTS 4,051,458 A * 9/1977 Morton .................... G06K 9/20
                                                      348/138
4,660,082 A * 4/1987 Tomohisa .............. H04N 1/401
                                                      348/251

(Continued)

FOREIGN PATENT DOCUMENTS

JP       S61222364 A    10/1986
JP       H03255780 A    11/1991

(Continued)

*Primary Examiner* — Madelein Nguyen
(74) *Attorney, Agent, or Firm* — Merchant & Gould P.C.

(57) ABSTRACT

An image reader including a controller configured to acquire white reference data based on a signal output from a sensor that has received reflected light from a white reference member, by controlling a light source to emit light of a first quantity onto the white reference member, acquire black reference data based on a signal output from the sensor that has received reflected light from the white reference member, by controlling the light source to emit light of a second quantity lower than the first quantity onto the white reference member, acquire image data of a document sheet based on a signal output from the sensor that has received reflected light from the document sheet, by controlling the light source to emit light of the first quantity onto the document sheet, and correct the acquired image data with the acquired white reference data and the acquired black reference data.

19 Claims, 8 Drawing Sheets

(56) References Cited

U.S. PATENT DOCUMENTS

| | | | | |
|---|---|---|---|---|
| 4,698,669 A * | 10/1987 | Sekizawa | G03G 15/011 | 358/507 |
| 4,926,253 A * | 5/1990 | Nakashima | H04N 1/40012 | 358/509 |
| 5,206,501 A * | 4/1993 | Sakakibara | H04N 1/4078 | 250/208.1 |
| 5,642,192 A * | 6/1997 | Gordon | G01J 3/10 | 356/328 |
| 5,880,859 A * | 3/1999 | Hiromatsu | H04N 1/486 | 358/514 |
| 6,072,912 A * | 6/2000 | Orito | H04N 1/401 | 358/442 |
| 6,151,419 A * | 11/2000 | Aoki | H04N 1/401 | 358/461 |
| 6,169,559 B1 * | 1/2001 | Au Yeung | H04N 1/40037 | 347/119 |
| 6,229,627 B1 * | 5/2001 | Taguchi | H04N 1/401 | 358/461 |
| 6,430,378 B1 * | 8/2002 | Ozawa | H04N 1/00002 | 358/406 |
| 6,665,096 B1 * | 12/2003 | Oh | H04N 1/4076 | 358/444 |
| 6,765,700 B1 * | 7/2004 | Naito | H04N 1/00795 | 358/406 |
| 6,958,834 B1 * | 10/2005 | Ide | H04N 1/401 | 358/461 |
| 7,031,029 B2 * | 4/2006 | Okamura | H04N 1/4076 | 358/406 |
| 7,423,784 B2 * | 9/2008 | Tanabe | H04N 1/401 | 358/461 |
| 8,330,999 B2 * | 12/2012 | Nagasaka | H04N 1/401 | 358/474 |
| 8,493,632 B2 * | 7/2013 | Akahane | H04N 1/4076 | 358/1.1 |
| 8,542,420 B2 * | 9/2013 | Ogawa | H04N 1/46 | 348/645 |
| 8,693,060 B2 * | 4/2014 | Ito | H04N 1/504 | 358/1.14 |
| 2003/0063327 A1 * | 4/2003 | Sone | H04N 1/00002 | 358/461 |
| 2003/0072497 A1 * | 4/2003 | Hiromatsu | H04N 1/401 | 382/274 |
| 2004/0174575 A1 * | 9/2004 | Ide | H04N 1/401 | 358/505 |
| 2004/0184116 A1 * | 9/2004 | Sakakibara | H04N 9/045 | 358/483 |
| 2006/0209312 A1 * | 9/2006 | Shoda | H04N 1/3871 | 358/1.1 |
| 2008/0007801 A1 * | 1/2008 | Yotsuyanagi | H04N 1/00681 | 358/500 |
| 2008/0055668 A1 * | 3/2008 | Hirayama | H04N 1/4076 | 358/461 |
| 2008/0123163 A1 * | 5/2008 | Nakano | H04N 1/00681 | 358/498 |
| 2009/0051910 A1 * | 2/2009 | Imura | G01J 3/0254 | 356/243.8 |
| 2009/0207450 A1 * | 8/2009 | Nagamochi | G01D 5/34746 | 358/2.1 |
| 2010/0073737 A1 * | 3/2010 | Honda | H04N 1/0473 | 358/474 |
| 2010/0214583 A1 * | 8/2010 | Suga | H04N 1/401 | 358/1.9 |
| 2010/0231991 A1 * | 9/2010 | Nakajima | H04N 1/00835 | 358/475 |
| 2010/0315687 A1 | 12/2010 | Sakane | | |
| 2011/0058237 A1 * | 3/2011 | Mikami | H04N 1/40056 | 358/509 |
| 2011/0075229 A1 * | 3/2011 | Fujiwara | H04N 1/00002 | 358/488 |
| 2011/0096370 A1 * | 4/2011 | Okamoto | H04N 1/00795 | 358/444 |
| 2011/0261417 A1 * | 10/2011 | Akahane | H04N 1/4076 | 358/461 |
| 2012/0044543 A1 * | 2/2012 | Mikami | H04N 1/401 | 358/461 |
| 2012/0307321 A1 * | 12/2012 | Nagasaka | H04N 1/4095 | 358/475 |
| 2012/0307325 A1 * | 12/2012 | Tagawa | H04N 1/401 | 358/518 |
| 2013/0170000 A1 * | 7/2013 | Kurakata | H04N 1/04 | 358/461 |
| 2013/0208323 A1 * | 8/2013 | Washizawa | H04N 1/12 | 358/406 |
| 2014/0029074 A1 * | 1/2014 | Tanaka | H04N 1/484 | 358/518 |
| 2014/0078532 A1 * | 3/2014 | Nikaku | G03G 15/00 | 358/1.13 |
| 2014/0293364 A1 * | 10/2014 | Kawai | H04N 1/00819 | 358/406 |
| 2014/0293371 A1 * | 10/2014 | Kurokawa | H04N 1/042 | 358/475 |
| 2014/0355082 A1 * | 12/2014 | Yoshida | H04N 1/00827 | 358/493 |
| 2015/0116707 A1 * | 4/2015 | Tatsuda | G01J 3/26 | 356/326 |
| 2015/0138561 A1 * | 5/2015 | Sano | G01J 3/26 | 356/454 |
| 2015/0229810 A1 * | 8/2015 | Sugiyama | H04N 1/1017 | 358/504 |
| 2015/0229811 A1 * | 8/2015 | Morita | H04N 1/6077 | 358/504 |
| 2015/0281503 A1 * | 10/2015 | Hori | H04N 1/02805 | 358/509 |

FOREIGN PATENT DOCUMENTS

| | | |
|---|---|---|
| JP | 2000174985 A | 6/2000 |
| JP | 2004040443 A | 2/2004 |
| JP | 2010288151 A | 12/2010 |
| JP | 2013102391 A | 5/2013 |

* cited by examiner

IMAGE READER, AND METHOD AND COMPUTER-READABLE MEDIUM THEREFOR

CROSS-REFERENCE TO RELATED APPLICATION

This application claims priority under 35 U.S.C. §119 from Japanese Patent Application No. 2014-025175 filed on Feb. 13, 2014. The entire subject matter of the application is incorporated herein by reference.

BACKGROUND

Technical Field

The following description relates to one or more aspects of an image reader, and a method and a computer-readable medium therefor.

Related Art

An image reader has been proposed that is configured to read an image of a document sheet by emitting light onto the document sheet and receiving reflected light from the document sheet by an image sensor. The image sensor is configured to generate electrical charges responsive to a quantity of the received light and output image signals based on the generated charges. Nevertheless, even when not receiving any light, the image sensor generates electrical charges and an electrical current. Such an electrical current, generated due to the electrical charges generated by the image sensor when the image sensor does not receive any light, is referred to as a dark current. The dark current has a negative influence, as a noise, on the read image. Therefore, various techniques to remove the influence of the dark current have been proposed. For instance, an image reader has been known that is configured to remove the influence of the dark current by acquiring white reference data based on reflected light from a white reference plate and black reference data based on reflected light from a black reference plate and performing shading correction based on the white reference data and the black reference data.

SUMMARY

Aspects of the present disclosure are advantageous to provide one or more improved techniques, for an image reader, which make it possible to achieve miniaturization of the image reader and reduce a time period required for a preparation operation ahead of an image reading operation.

According to aspects of the present disclosure, an image reader is provided that includes a light source configured to emit light onto an intended object, a sensor configured to receive reflected light from the intended object and convert the received light into an image signal, a white reference member, and a controller configured to acquire white reference data based on an image signal output from the sensor that has received reflected light from the white reference member, by controlling the light source to emit light of a first quantity onto the white reference member, acquire black reference data based on an image signal output from the sensor that has received reflected light from the white reference member, by controlling the light source to emit light of a second quantity onto the white reference member, the second quantity being adjusted lower than the first quantity, acquire image data of a document sheet based on an image signal output from the sensor that has received reflected light from the document sheet, by controlling the light source to emit light of the first quantity onto the document sheet, and correct the acquired image data with the acquired white reference data and the acquired black reference data.

According to aspects of the present disclosure, further provided is a method adapted to be implemented on a processor coupled with a light source and a sensor, the method including acquiring white reference data based on an image signal output from the sensor that has received reflected light from a white reference member, by causing the light source to emit light of a first quantity onto the white reference member, acquiring black reference data based on an image signal output from the sensor that has received reflected light from the white reference member, by causing the light source to emit light of a second quantity onto the white reference member, the second quantity being adjusted lower than the first quantity, acquiring image data of a document sheet based on an image signal output from the sensor that has received reflected light from the document sheet, by causing the light source to emit light of the first quantity onto the document sheet, and correcting the acquired image data with the acquired white reference data and the acquired black reference data.

According to aspects of the present disclosure, further provided is a non-transitory computer-readable medium storing computer-readable instructions that are executable by a processor coupled with a light source and a sensor, the instructions being configured to, when executed by the processor, cause the processor to acquire white reference data based on an image signal output from the sensor that has received reflected light from a white reference member, by controlling the light source to emit light of a first quantity onto the white reference member, acquire black reference data based on an image signal output from the sensor that has received reflected light from the white reference member, by controlling the light source to emit light of a second quantity onto the white reference member, the second quantity being adjusted lower than the first quantity, acquire image data of a document sheet based on an image signal output from the sensor that has received reflected light from the document sheet, by controlling the light source to emit light of the first quantity onto the document sheet, and correct the acquired image data with the acquired white reference data and the acquired black reference data.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 2:
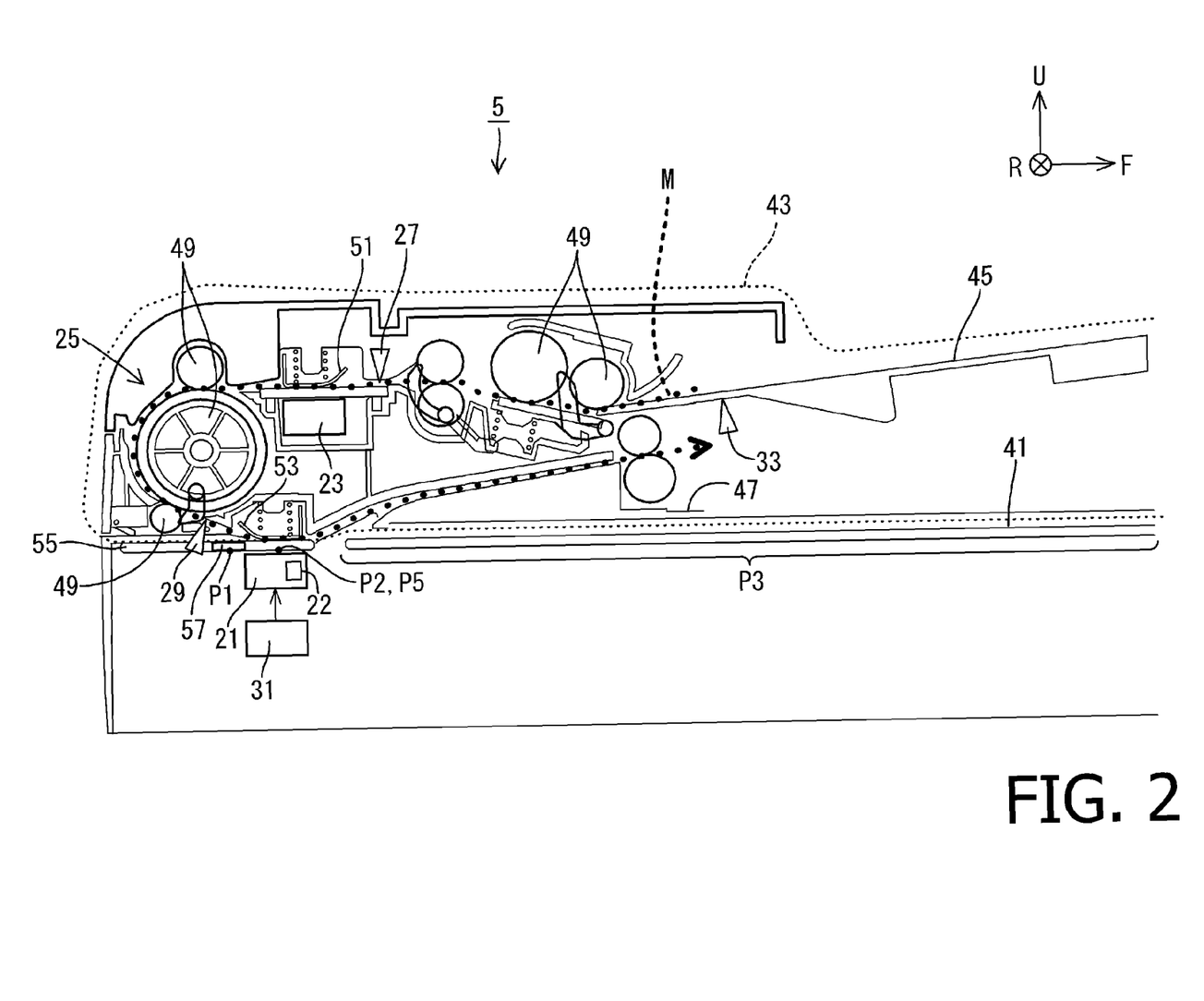
FIG. 2 is a cross-sectional side view of the MFP in the illustrative embodiment according to one or more aspects of the present disclosure.

Hereinafter, a multi-function peripheral 1 (hereinafter referred to as an "MFP 1") in an illustrative embodiment according to aspects of the present disclosure will be described with reference to the accompanying drawings. The MFP 1 has a plurality of functions such as a copy function and a scanning function. In the following description, as shown in FIG. 2, the right side of the figure will be defined as a front side (F) of the MFP 1. The far side with respect to an image-drawn surface of FIG. 2 will be defined as a right side (R) of the MFP 1. The upside of FIG. 2 will be defined as an upper side (U) of the MFP 1.

(Electrical Configuration of MFP)

Figure 1:
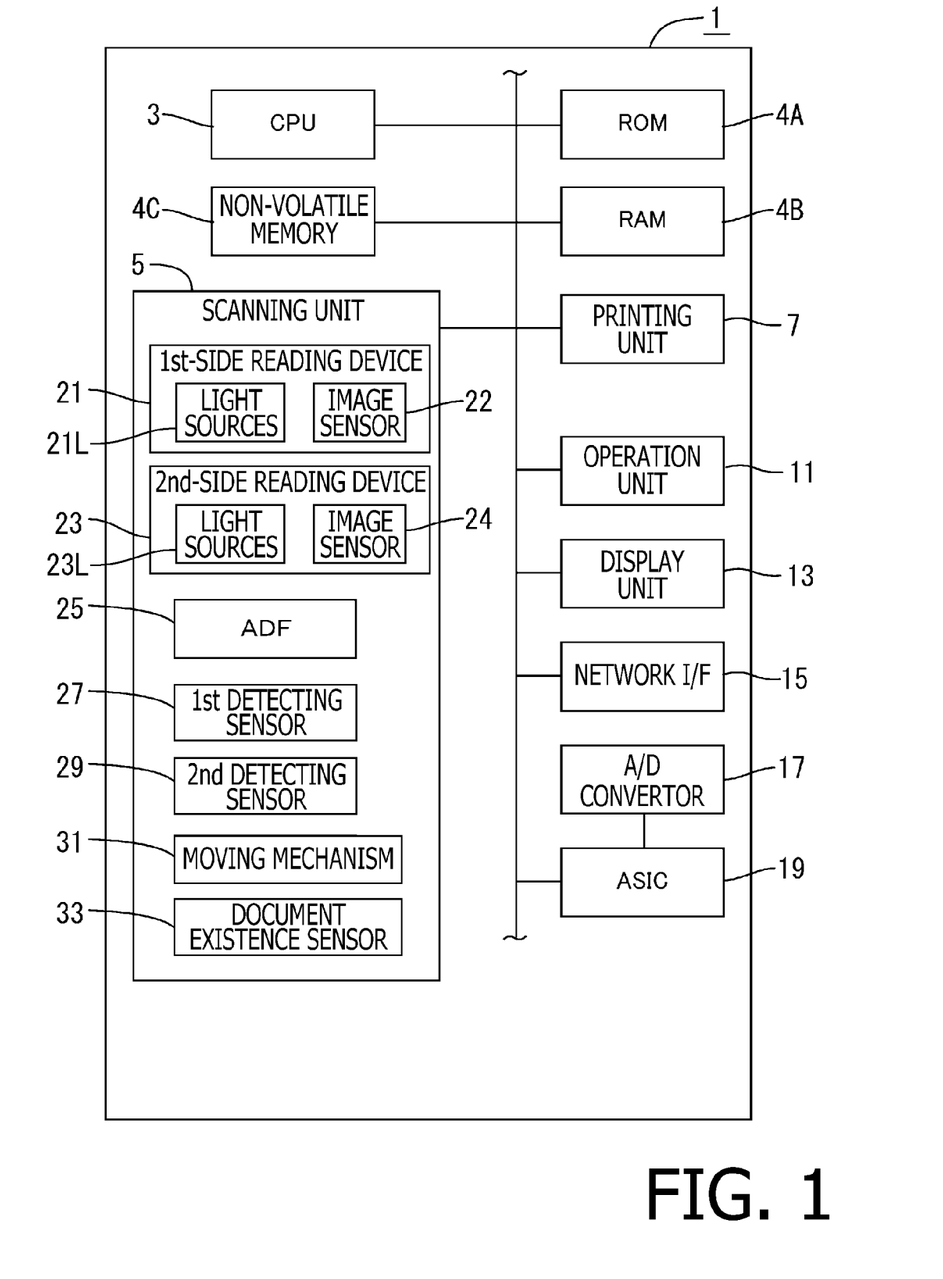
FIG. 1 is a control block diagram of a multi-function peripheral (hereinafter referred to as an "MFP" in an abbreviation form) in an illustrative embodiment according to one or more aspects of the present disclosure.

As shown in FIG. 1, the MFP 1 includes a central processing unit 3 (hereinafter referred to as a "CPU 3"), a read-only memory 4A (hereinafter referred to as a "ROM 4A"), a random access memory 4B (hereinafter referred to as a "RAM 4B"), a non-volatile memory 4C, a scanning unit 5, a printing unit 7, an operation unit 11, a display unit 13, a network interface 15, an A/D converter 17, and an application specific integrated circuit 19 (hereinafter referred to as an "ASIC 19").

The ROM 4A is configured to store various computer-executable programs such as a program for executing a below-mentioned black-reference-data determining process, a program for executing a scanning process, and programs for performing various operations of the MFP 1. The CPU 3 is connected with the ROM 4A and the RAM 4B. The CPU 3 is configured to control various elements included in the MFP 1 in accordance with programs read out from the ROM 4A.

The RAM 4B is used as a work area when the CPU 3 executes programs, and as a memory area for temporarily storing data. The non-volatile memory 4C is configured to store various kinds of data such as below-mentioned read data. The non-volatile memory 4C is a storage device configured to save data even when an electric power supply thereto is interrupted is used. For example, an NVRAM, a flash memory, an HDD, and an EEPROM may be used as the non-volatile memory 4C.

The aforementioned various programs may be stored in a CD-ROM or an HDD instead of the ROM 4A.

The scanning unit 5 is configured to read an image of a document sheet M and generate read data that is pixel row data corresponding to the read image. The scanning unit 5 includes a first-side reading device 21, a second-side reading device 23, an automatic document feeder 25 (hereinafter referred to as an "ADF 25"), a first detecting sensor 27, a second detecting sensor 29, a moving mechanism 31, and a document existence sensor 33. A detailed configuration of the scanning unit 5 will be described later.

The printing unit 7 is configured to print, on sheets, monochrome images and color images based on image data (e.g., the above read data) in a predetermined printing method such as an electrophotographic method or an inkjet method. The operation unit 11 includes a plurality of operable members such as buttons. A user is allowed to perform an operation of inputting data or information through the operation unit 11. The display unit 13 includes a liquid crystal display (hereinafter referred to an "LCD") and lamps. The display unit 13 is configured to display various setting screens and an operational status of the MFP 1.

The network interface 15 is connected with an external device such as a personal computer (not shown) via a network line (not shown). Thereby, the network interface 15 enables mutual data communication between the MFP 1 and the external device. The A/D converter 17 is configured to convert the read data generated as analog signals by the scanning unit 5, into digital signals and to transmit the digital signal to the ASIC 19.

(Specific Configuration of Scanning Unit)

As shown in FIG. 2, the scanning unit 5 is disposed above a main body of the MFP 1 where the printing unit 7 is disposed. The MFP 1 includes an FB glass plate 41. Further, the MFP 1 includes a document table cover 43 configured to cover the FB glass plate 41. The document table cover 43 is attached to a frame portion of the FB glass plate 41 in an openable and closable manner. There is an ADF glass plate 55 disposed below the document table cover 43.

The first-side reading device 21 and the moving mechanism 31 are disposed below the FB glass plate 41 and the ADF glass plate 55. The second-side reading device 23, the ADF 25, the first detecting sensor 27, the second detecting sensor 29, and the document existence sensor 33 are disposed inside the document table cover 43.

In the following description, an upward-facing surface of the document sheet M placed on a document tray 45 will be defined as a first side of the document sheet M. Further, a downward-facing surface of the document sheet M placed on the document tray 45 will be defined as a second side of the document sheet M.

The first-side reading device 21 includes respective light sources 21L of RGB as light emitting devices, and an image sensor 22 as an image capturing device. Likewise, the second-side reading device 23 includes respective light sources 23L of RGB as light emitting devices, and an image sensor 24 as an image capturing device. Each of the image sensors 22 and 24 includes a plurality of light receiving chips linearly arranged along a main scanning direction (parallel to the left-to-right direction of the MFP 1, see FIG. 2). Each light receiving chip includes a plurality of lenses (not shown) arranged along the main scanning direction, and a plurality of light receiving elements (not shown) arranged along the main scanning direction.

The document table cover 43 includes the document tray 45 configured to support document sheets M placed thereon, and a document discharge tray 47 disposed below the document tray 45. Further, the document existence sensor 33 is disposed close to the document tray 45. The document existence sensor 33 is configured to detect whether there is a document sheet M on the document tray 45 and transmit the detection result to an A/D converter (not shown) coupled with the CPU 3. Inside the document table cover 43, a conveyance path is formed. The conveyance path is configured to turn around a document sheet M fed from the document tray 45, in a U-shape, and convey the document sheet M therealong to the document discharge tray 47. The ADF 25 includes a plurality of feed rollers 49 and a document pressing member 53 that are disposed along the conveyance path.

The second-side reading device 23 is disposed under an anterior section of the conveyance path leading to a turn-around section (where the document sheet M is turned around) from the document tray 45. The second-side reading device 23 is configured to read an image on a second side of the document sheet M fed from the document tray 45, and transmit read data corresponding to the read image on the second side to the A/D converter 17. The second-side reading device 23 is unmovable. A white reference member 51 for the second side (hereinafter, which may be referred to as a "second-side white reference member 51") is opposed to the second-side reading device 23 across the conveyance path.

The first detecting sensor 27 is disposed upstream relative to a second-side reading position of the second-side reading device 23 in a document conveyance direction. The first detecting sensor 27 is configured to detect the document sheet M having come close to the second-side reading position, and transmit the detection result to the A/D converter (not shown) coupled with the CPU 3. The first-side reading device 21 is disposed below a posterior section of the conveyance path leading to the document discharge tray 47 from the turn-around section. The first-side reading device 21 is configured to read an image on the first side of the document sheet M, and transmit read data corresponding to the read image on the first side to the A/D converter 17.

The first-side reading device 21 is configured to be moved by the moving mechanism 31, along the front-to-rear direction of the MFP 1 (see FIG. 2) that is parallel to the FB glass plate 41 and the ADF glass plate 55. Specifically, on a lower surface of the ADF glass plate 55, a white reference member 57 for the first side (hereinafter, which may be referred to as a "first-side white reference member 57") is disposed. A first-side reading position of the first-side reading device 21 in a document feeding operation using the ADF 25 is beneath the document pressing member 53.

The moving mechanism 31 is configured to move the first-side reading device 21 to positions P1, P2, and P3. The position P1 is opposed to the first-side white reference member 57. The position P2 is opposed to the first-side reading position. The position(s) P3 are underneath the FB glass plate 41. The second detecting sensor 29 is disposed upstream relative to the document pressing member 53 in the document conveyance direction. The second detecting sensor 29 is configured to detect the document sheet M having come close to the first-side reading position, and transmit the detection result to the A/D converter (not shown) coupled with the CPU 3.

The MFP 1 has an FB reading function and an ADF reading function as the scanning function. The MFP 1 performs the FB reading function when there is not any document sheet M detected by the document existence sensor 33. Meanwhile, the MFP 1 performs the ADF reading function when there is a document sheet M detected by the document existence sensor 33. The FB reading function is to read an image on a downward-facing side of a document sheet M statically placed on the FB glass plate 41. In execution of the FB reading function, the first-side reading device 21 reads the image of the downward-facing side of the document sheet M in a static state while being moved by the moving mechanism 31 in a sub scanning direction (parallel to the front-to-rear direction of the MFP 1, see FIG. 2) under the FB glass plate 41.

The ADF reading function is to read one or more images of a document sheet M while automatically feeding the document sheet M by the ADF 25. The MFP 1 has a single-side reading function and a double-side reading function as the ADF reading function. In the single-side reading function, the MFP 1 cause the first-side reading device 21 to read an image on a first side of a document sheet M. In the double-side reading function, the MFP 1 performs in parallel image reading of the first side of the document sheet M by the first-side reading device 21 and image reading of the second side of the document sheet M by the second-side reading device 23.

(Acquisition of Black Reference Data)

There is dispersion in sensitivity among the light receiving elements of the image sensors 22 and 24 of the reading devices 21 and 23. In general, shading correction is performed to correct image reading errors due to the dispersion in sensitivity (or other properties) among the light receiving elements.

In general, the shading correction is performed using the following expression 1. It is noted that the following description will be provided under an assumption that an electric signal corresponding to a light receiving quantity of each light receiving element has a pixel value of 256 gradations from 0 (black) to 255 (white).

$$\text{corrected read data} = [(\text{uncorrected read data} - \text{black reference data})/(\text{white reference data} - \text{black reference data})] \times 255 \quad \text{(Expression 1)}$$

Further, white reference data for each color of RGB may be acquired by receiving read data from each of the image sensors 22 and 24 in a state where each light source of RGB of each of the reading devices 21 and 23 are driven to emit light onto a corresponding one of the white reference members 51 and 57. Meanwhile, for instance, black reference data for each color of RGB for each of the reading devices 21 and 23 may be acquired by receiving read data from each of the image sensors 22 and 24 in a state where the respective light sources of RGB of each of the image sensors 22 and 24 are not lighted.

Figure 3:
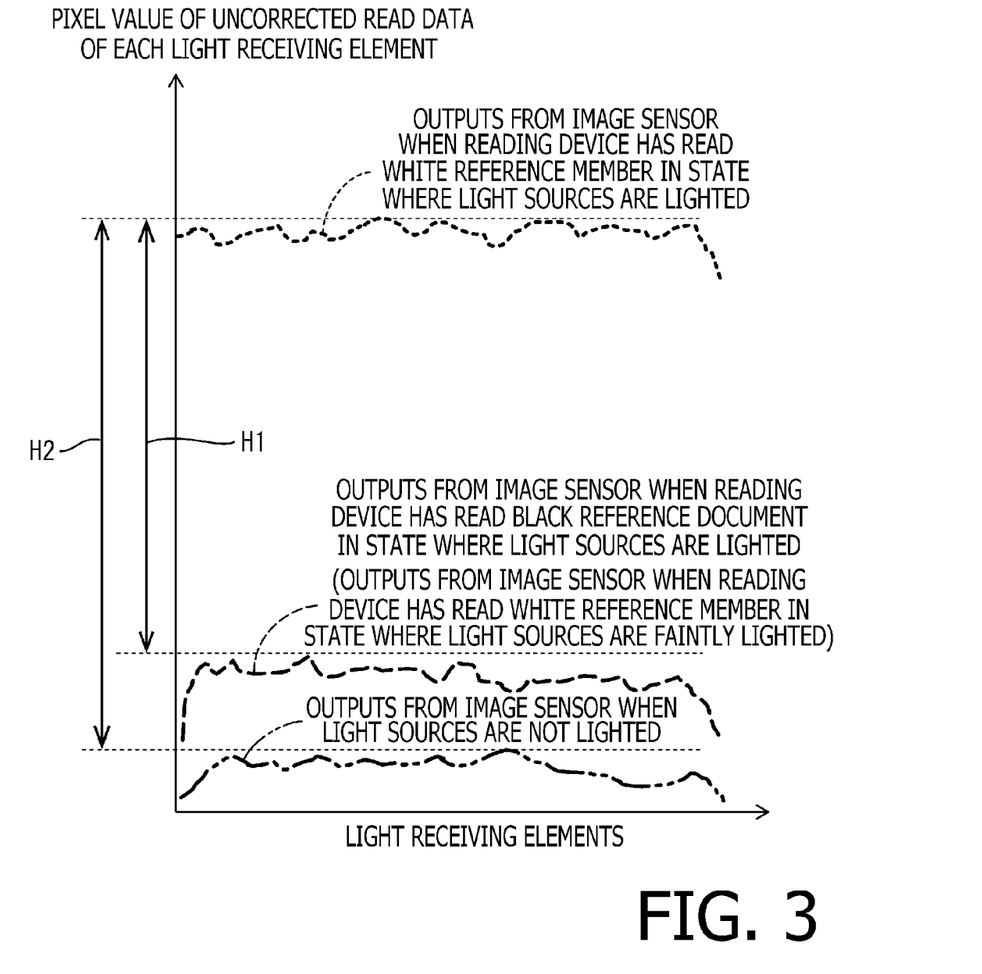
FIG. 3 shows pixel values of uncorrected read data of light receiving elements of an image sensor of a first-side reading device of the MFP in the illustrative embodiment according to one or more aspects of the present disclosure.

FIG. 3 exemplifies relationships between the light receiving elements of the image sensor 22 arranged along the main scanning direction and respective pixel values of uncorrected read data of the light receiving elements. In FIG. 3, the highest one of three plotted lines shows a variation of output values from the light receiving elements of the image sensor 22 when the reading device 21 (the image sensor 22) has read the first-side white reference member 57. Specifically, the highest plotted line shows respective pixel values of the light receiving elements of the image sensor 22 when the reading device 21 has read the first-side white reference member 57 in a state where the light sources 21L of the reading device 21 are lighted. The second highest plotted line shows a variation of output values from the light receiving elements of the image sensor 22 when the reading device 21 (the image sensor 22) has read a black reference document. The black reference document may be a black paper. The black reference document may be read in order to acquire black reference data before a document sheet M is read. The second highest plotted line shows respective pixel values of the light receiving elements of the image sensor 22 when the reading device 21 has read the black reference document in a state where the light sources 21L of the reading device 21 are lighted. At this time, a range H1 shown in FIG. 3 is an output range between an output level of the image sensor 22 when the reading device 21 has read the first-side white reference member 57 and an output level thereof when the reading device 21 has read the black reference document.

Further, the lowest one of the three plotted lines shows a variation of output values from the light receiving elements of the image sensor 22 when the light sources 21L of the reading device 21 are not lighted. Specifically, the lowest plotted line shows respective pixel values of the light receiving elements of the image sensor 22 when the light sources 21L of the reading device 21 are not lighted. Thus, an output level of the image sensor 22 when the light sources 21L of the reading device 21 are not lighted is lower than an output level thereof when the reading device 21 has read the black reference document in the state where the light sources 21L of the reading device 21 are lighted. At this time, a range H2, wider than the range H1, is an output range between the output level of the image sensor 22 when the reading device 21 has read the first-side white reference member 57 and an output level thereof when the light sources 21L of the reading device 21 are not lighted.

In actual reading of a document sheet M, even if the document sheet M is black, the reading device 21 reads the document sheet M while lighting the light sources 21L of the reading device 21. Accordingly, when shading correction is performed based on the output level of the image sensor 22 in the case where the reading device 21 has read the first-side white reference member 57 and the output level of the image sensor 22 in the state where the light sources 21L of the reading device 21 are not lighted, a black document is read at an output level higher than the output level when the light sources 21L of the reading device 21 are not lighted. This is so-called "black floating," which is a situation where the black document is unable to be read as a pitch-black one (a darkest-black one).

Therefore, an MFP has been known that is configured to perform some sort of correction (such as gamma correction) to make black-side gradations less useful (e.g., to set the black-side gradations as pitch black). Nevertheless, the known MFP has a problem that the MFP is not allowed to fully utilize an original dynamic range of output signals from an image sensor of the MFP, and it leads to a lower S/N ratio of the output signals.

In the illustrative embodiment, the CPU 3 performs a below-mentioned black-reference-data determining process so as to achieve image reading with an improved S/N ratio. Hereinafter, an explanation will be provided about an example in which a document sheet M is read using the FB reading function.

Figure 4A:
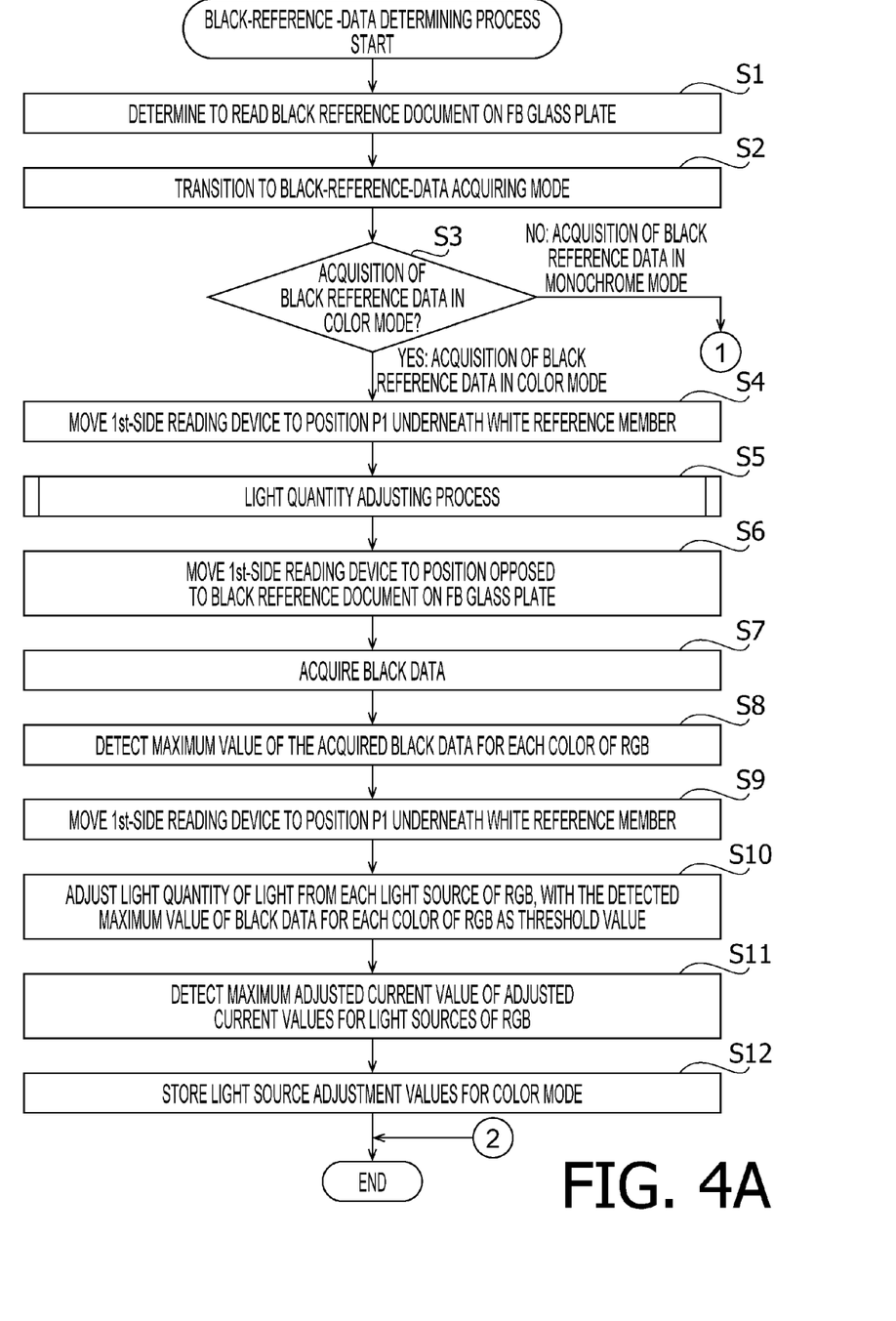
FIGS. 4A and 4B are flowcharts showing a procedure of a black-reference-data determining process in the illustrative embodiment according to one or more aspects of the present disclosure.
Figure 4B:
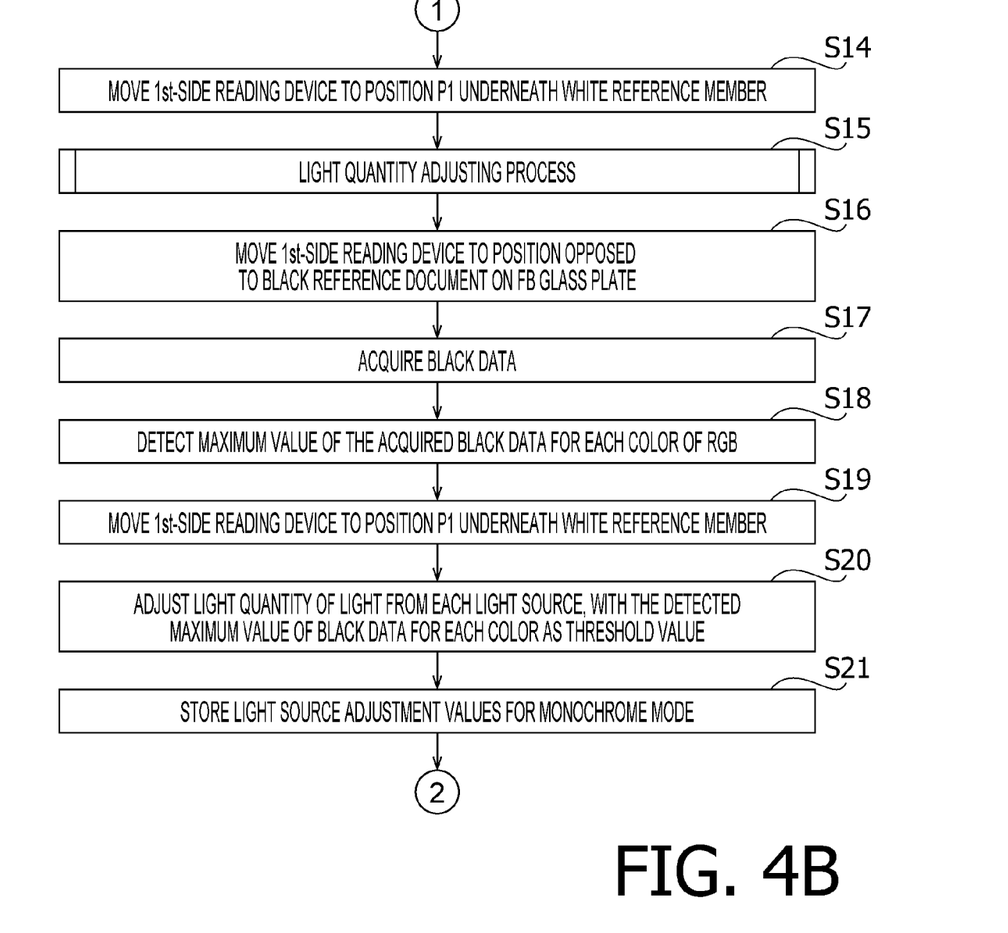

(Black-Reference-Data Determining Process) The CPU 3 performs a black-reference-data determining process shown in FIGS. 4A and 4B, as a correction process to be executed in a process of manufacturing the MFP 1.

When determining that the document existence sensor 33 does not detect a black reference document placed on the document tray 45, i.e., determining to read a black reference document placed on the FB glass plate 41 (S1), the CPU 3 makes mode transition to a black-reference-data acquiring mode (S2). When determining that acquisition of black reference data in a color mode is selected through the operation unit 11 (S3: Yes), the CPU 3 controls the moving mechanism 31 to move the first-side reading device 21 to the position P1 opposed to the first-side white reference member 57 (S4). Then, the CPU 3 performs a light quantity adjusting process (S5). The light quantity adjusting process is a process for adjusting a light quantity of each light source 21L of RGB with the first-side white reference member 57.

Figure 5:
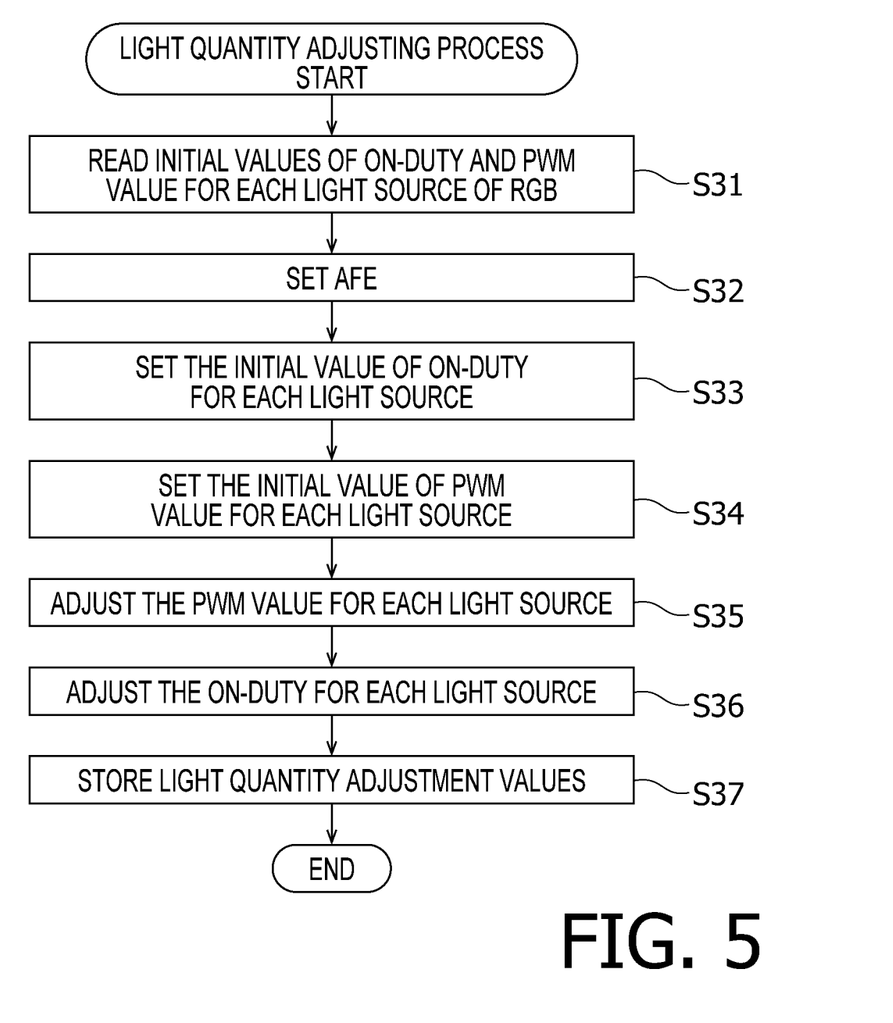
FIG. 5 is a flowchart showing a procedure of a light quantity adjusting process in the illustrative embodiment according to one or more aspects of the present disclosure.

Hereinafter, referring to FIG. 5, the light quantity adjusting process in S5 will be described. In S31, to adjust the light quantity of each light source 21L of RGB, the CPU 3 adjusts a current value of an electric current to be supplied to each light source 21L of RGB and adjusts a time period for lighting each light source 21L of RGB with the adjusted current value. Specifically, the CPU 3 firstly reads out initial values of an on-duty and of a PWM value for each light source 21L of RGB, from the ROM 4A (S31). The PWM value is a value for determining the current value of the electric current to be supplied to each light source 21L of RGB based on a PWM signal. The on-duty is a value for determining a lighting period for lighting each light source 21L of RGB in a single scanning line. Hereinafter, the lighting period for each light source 21L of RGB may be referred to as a "color lighting period."

Subsequently, the CPU 3 sets an analog front end (AFE) to adjust a gain and an offset of the AFE (S32). Thereafter, based on the initial values of the on-duty and the PWM value read out from the ROM 4A in S31, the CPU 3 sets the on-duty for each light source 21L of RGB (S33), and sets the PWM value for each light source 21L of RGB (S34).

Next, the CPU 3 sets the lighting period for each light source 21L of RGB to a longest possible period, and adjusts the PWM value for each light source 21L of RGB such that the light quantity of each light source 21L of RGB becomes a predetermined white level. Thus, the CPU 3 adjusts the current value of the electric current to be supplied to each light source 21L of RGB. The CPU 3 determines, for each light source 21L of RGB, a PWM value corresponding to a maximum current value of the respective current values adjusted for the light sources 21L of RGB (S35). Subsequently, the CPU 3 lights each light source 21L of RGB with the maximum current value, and adjusts the on-duty for each light source 21L of RGB such that the respective light quantities of the light sources 21L of RGB become identical to each other. Thereby, the CPU 3 adjusts (shortens) the lighting period of each light source 21L of RGB (S36). The CPU 3 stores light quantity adjustment values into the non-volatile memory 4C (S37). The light quantity adjustment values include the on-duty corresponding to the adjusted lighting period for each light source 21L, and the PWM value for each light source 21L that corresponds to the maximum current value. Thereafter, the CPU 3 terminates the light quantity adjusting process, and goes to S6 in FIG. 4A.

In S6, the CPU 3 controls the moving mechanism 31 to move the first-side reading device 21 to a position opposed to the black reference document. Then, the CPU 3 acquires black data for each color of RGB (for each light source 21L of RGB) based on the black reference document (S7). The CPU 3 detects a maximum value (a maximum value of digital signals) of the acquired black data (see S7) for each color of RGB, with respect to each light source 21L of RGB (S8). Thereafter, the CPU 3 controls the moving mechanism 31 to move the first-side reading device 21 to the position P1 opposed to the first-side white reference member 57 (S9).

The CPU 3 adjusts the light quantity of the light from each light source 21L of RGB, with the detected maximum value (see S8) of the black data for each color of RGB as a threshold value (a reference value) (S10). Specifically, the CPU 3 separately drives each light source 21L of RGB to emit "faint" light onto the first-side white reference member 57 during a period as long as the longest one (hereinafter referred to as the "longest lighting period") of the adjusted lighting periods. The expression "drive each light source 21L to emit faint light" means to "faintly" light each light source 21L with a current value that is adjusted smaller than a current value for reading the document sheet M such that the pixel values of the read data output from the image sensor 22 become as high as the output level of the image sensor 22 when the reading device 21 has read the black reference document.

Further, in S10, the CPU 3 adjusts the current value of the electric current to be supplied to each light source 21L of RGB in such a manner that the detected maximum value (see S8) of the black data for each color of RGB is identical to a maximum value of digital signals based on the read data of the first-side white reference member 57. Thus, the CPU 3 adjusts the light quantity of each light source 21L of RGB.

Subsequently, the CPU 3 detects the maximum one (hereinafter referred to as a "maximum adjusted current value") of the adjusted current values for the light sources 21L of RGB (S11). Thereafter, the CPU 3 stores, into the non-volatile memory 4C, light source adjustment values for acquiring black reference data in the color mode (S12). The light source adjustment values for the color mode include the period as long as the longest lighting period, the maximum adjusted current value, and a color of a specific light source 21L supplied with an electric current of the maximum adjusted current value. Then, the CPU 3 terminates the black-reference-data determining process.

The CPU 3 adjusts the light quantity of each light source of RGB of each of the reading devices 21 and 23 in a below-mentioned step S42 in FIG. 6, with the detected maximum value (see S8) of the black data for each color of RGB as a threshold value (a reference value). Thus, a lighting condition for lighting each light source 21L of RGB to read the document sheet M is different from a lighting condition for lighting each light source 21L of RGB to acquire the black data. Thereby, it is possible to prevent the aforementioned "black floating." Further, in a below-mentioned step S43 in FIG. 6, the CPU 3 sets, as black, the detected maximum value (see S8) of the black data for each color of RGB i.e., the maximum value of the output values (see the second highest plotted line in FIG. 3) from the image sensor 22 when each light source 21L of RGB of the reading device 21 is driven to emit faint light onto the first-side white reference member 57. Therefore, it is possible to make the output range H1 for reading the document sheet M coincident with the gradation range of the pixel value of each light receiving element of the image sensor 22. Thus, it is possible to fully utilize the gradation range, without making black-side gradations less useful (e.g., setting the black-side gradations as pitch black).

Further, the specific light source 21L of the color corresponding to the maximum adjusted current value is driven with a larger amount of electric power consumption and a larger amount of heat generation in comparison with the light sources 21L of the other colors. Therefore, the heat generated by the specific light source 21L would have an influence on the light receiving elements. Thus, it is possible to acquire black reference data in a state close to a state where the CPU 3 is executing a below-mentioned scanning process.

Meanwhile, when determining that acquisition of black reference data in a monochrome mode is selected through the operation unit 11 (S3: No), the CPU 3 controls the moving mechanism 31 to move the first-side reading device 21 to the position P1 opposed to the first-side white reference member 57 (S14). Then, the CPU 3 performs a light quantity adjusting process (S15). It is noted that the light quantity adjusting process in S15 shares most of operations of the light quantity adjusting process in S5, except for a below-mentioned difference. Therefore, explanations on the operations common to S5 and S15 will be omitted. The difference from S5 is that, in S15, the CPU 3 sets a lighting period (hereinafter referred to as a "monochrome lighting period") for lighting each light source 21L of RGB, by measuring a time period required for reading a single line of the first-side white reference member 57 in the main scanning direction and equally dividing the measured time period into three periods.

After completion of the light quantity adjusting process in S15, the CPU 3 controls the moving mechanism 31 to move the first-side reading device 21 to a position opposed to the black reference document (S16). Next, the CPU 3 acquires black data for each color of RGB based on the black reference document (S 17). The CPU 3 detects a maximum value (a maximum value of digital signals) of the acquired black data (see S17) for each color of RGB (S18). Thereafter, the CPU 3 controls the moving mechanism 31 to move the first-side reading device 21 to the position P1 opposed to the first-side white reference member 57 (S19).

The CPU 3 adjusts the light quantity of the light from each light source 21L of RGB, with the detected maximum value (see S18) of the black data for each color of RGB as a threshold value (a reference value) (S20). Specifically, the CPU 3 simultaneously drives all of the light sources 21L of RGB to emit faint light onto the first-side white reference member 57 during the monochrome lighting period set in S15.

Thereafter, the CPU 3 adjusts the current value of the electric current to be supplied to each light source 21L of RGB in such a manner that the detected maximum value (see S18) of the black data for each color of RGB is identical to a maximum value of digital signals based on the read data of the first-side white reference member 57. Thus, the CPU 3 adjusts the light quantity of each light source 21L of RGB. Thereby, in the same manner as the color mode, it is possible to prevent the aforementioned "black floating" and to fully utilize the gradation range, without making black-side gradations less useful (e.g., setting the black-side gradations as pitch black).

Subsequently, the CPU 3 stores, into the non-volatile memory 4C, light source adjustment values for acquiring black reference data in the monochrome mode (S21). The light source adjustment values for the monochrome mode include the current value (hereinafter referred to as the "coincidence-achieved current value") adjusted for each individual light source 21L in S20, and the monochrome lighting period (hereinafter referred to as the "coincidence-achieved lighting period") set in S15 to simultaneously light all of the light sources 21L of RGB with the respective coincidence-achieved current values. Then, the CPU 3 terminates the black-reference-data determining process.

(Scanning Process)

When performing image reading, the CPU 3 executes a below-mentioned scanning process. Hereinafter, an explanation will be provided about an example in which a document sheet M is read using the FB reading function.

Figure 6:
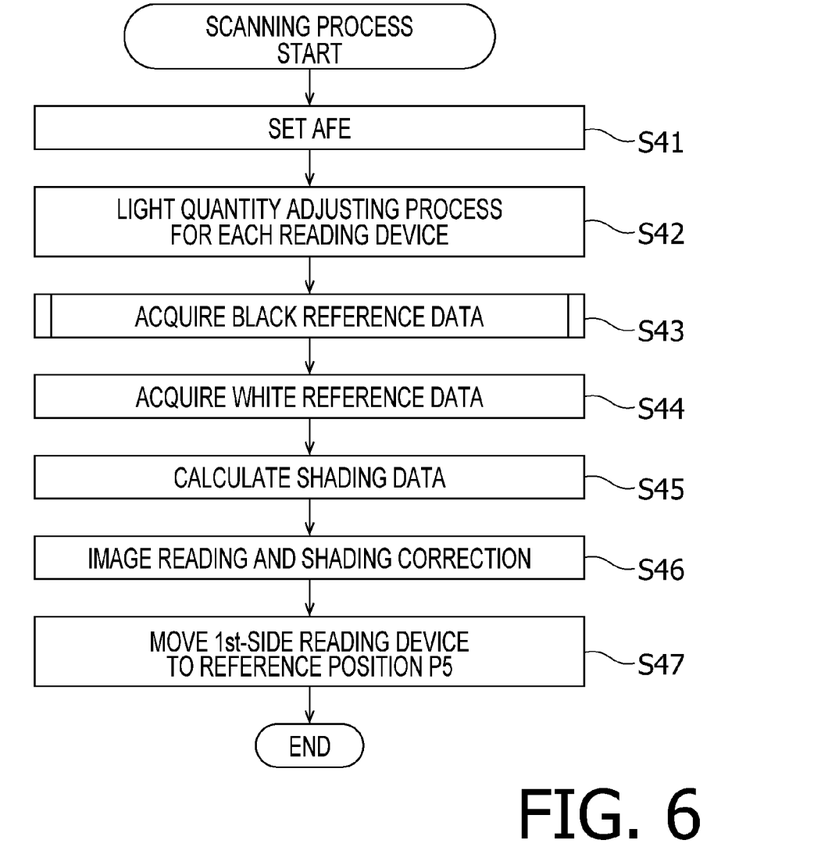
FIG. 6 is a flowchart showing a procedure of a scanning process in the illustrative embodiment according to one or more aspects of the present disclosure.

When the user performs an operation of issuing an instruction to perform the scanning function through the operation unit 11 or an input unit of the external device, the CPU 3 executes a scanning process shown in FIG. 6 in response to determining that there is not a document sheet M on the document tray 45 with the document existence sensor 33.

Initially, the CPU 3 sets the analog front end (AFE) to adjust the gain and the offset of the AFE (S41). After that, the CPU 3 performs a light quantity adjusting process for each of the reading devices 21 and 23 (S42). In the light quantity adjusting process in S42, the CPU 3 may perform the same operations as exemplified in S5, S31, and S37.

Subsequently, the CPU 3 acquires black reference data (S43). Specifically, in S43, the CPU 3 executes a black-reference-data acquiring process shown in FIG. 7. In the black-reference-data acquiring process, firstly, the CPU 3 controls the moving mechanism 31 to move the first-side reading device 21 to the position P1 opposed to the first-side white reference member 57 (S51).

Figure 7:
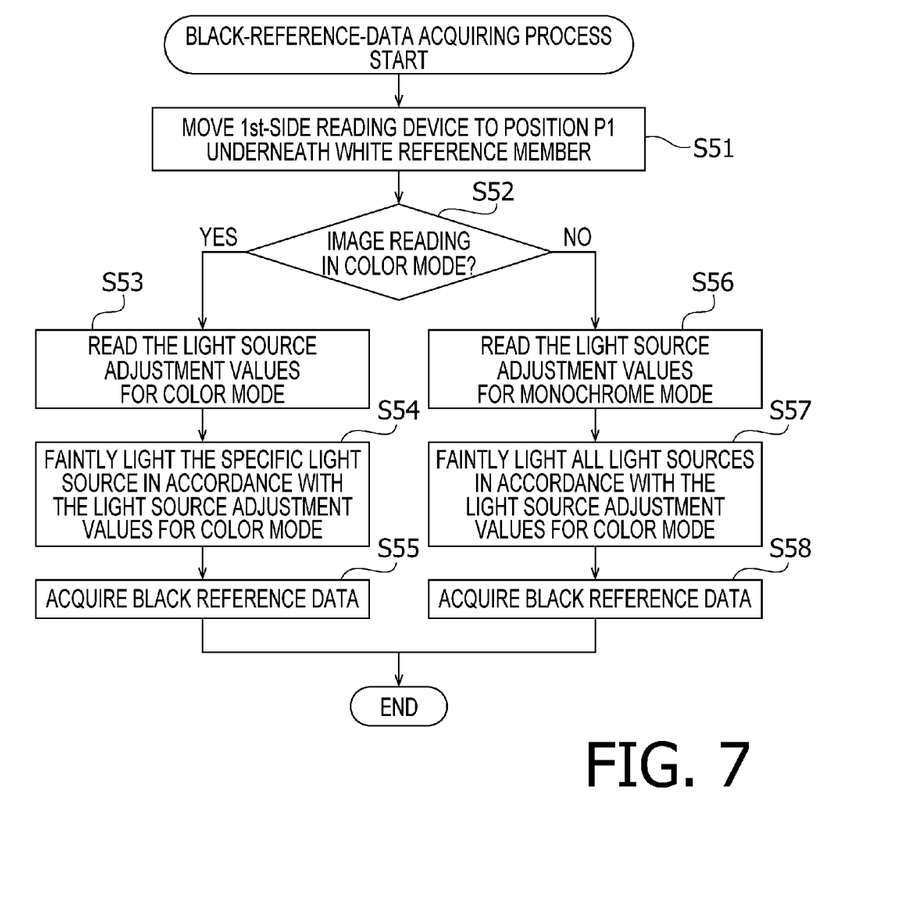
FIG. 7 is a flowchart showing a procedure of a black-reference-data acquiring process of acquiring black reference data in a state where each light source is faintly lighted, in the illustrative embodiment according to one or more aspects of the present disclosure.

Thereafter, the CPU 3 determines whether image reading is to be performed in the color mode (S52). When determining that image reading is to be performed in the color mode (S52: Yes), the CPU 3 reads out, from the non-volatile memory 4C, the light source adjustment values for acquiring black reference data in the color mode (S53). The light source adjustment values for the color mode include the period as long as the longest lighting period, the maximum adjusted current value, and the color of the specific light source 21L supplied with an electric current of the maximum adjusted current value.

The CPU 3 drives the specific light source 21L of the read-out color to emit faint light onto the first-side white reference member 57 during the period as long as the longest lighting period, with an electric current of the maximum adjusted current value (S54). In this state, the CPU 3 receives pixel row data that is read data generated when the first-side white reference member 57 was read by the image sensor 22. Thereby, the CPU 3 acquires black reference data for RGB (S55). Then, the CPU 3 terminates the black-reference-data acquiring process.

Meanwhile, when determining that image reading is not to be performed in the color mode (S52: No), the CPU 3 reads out, from the non-volatile memory 4C, the light source adjustment values for acquiring black reference data in the monochrome mode (S56). The light source adjustment values for the monochrome mode include the coincidence-achieved current value and the coincidence-achieved lighting period.

The CPU 3 drives each light source 21L of RGB to emit faint light onto the first-side white reference member 57 during the coincidence-achieved lighting period, with an electric current of the coincidence-achieved current value (S57). In this state, the CPU 3 receives pixel row data that is read data generated when the first-side white reference member 57 is read by the image sensor 22. Thereby, the CPU 3 acquires black reference data for RGB (S58). Then, the CPU 3 terminates the black-reference-data acquiring process.

Subsequently, the CPU 3 acquires white reference data (S44). In a state where each light source of RGB of each of the reading devices 21 and 23 is lighted, the CPU 3 receives pixel row data that is read data generated when the first-side white reference member 57 is read by the image sensor 22. Thereby, the CPU 3 acquires the white reference data (S44).

Next, the CPU 3 determines (calculates) shading data based on the acquired white reference data and the acquired black reference data (S45). Thereafter, the CPU 3 starts an image reading operation of reading the document sheet M to acquire read data, and performs shading correction for the read data based on the shading data (S46).

After completion of the image reading operation, the CPU 3 controls the moving mechanism 31 to move the first-side reading device 21 back to a reference position P5 (S47). Thereafter, the CPU 3 terminates the scanning process.

An image reader has been known that is configured to drive light sources to emit light onto a black reference plate and acquire black reference data so as to remove an influence of a dark current depending on whether the light sources are lighted or not. Nevertheless, the known image reader is required to have the black reference plate. Further, the image reader is required to control the light sources to be positioned underneath the black reference plate. The requirements make it difficult to miniaturize the image reader and reduce a time period required for a preparation operation such as positioning of the light sources before an image reading operation.

As described above, the MFP 1 according to aspects of the present disclosure is configured to drive the light sources 21L to emit light onto the white reference member 57, acquire black reference data, and perform shading correction based on the acquired black reference data. Therefore, the MFP 1 needs not read a black reference member to acquire black reference data. Thus, it is possible to achieve miniaturization of the MFP 1 and simplification of a preparation operation to be executed ahead of an image reading operation.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiment, the MFP 1 includes a single CPU (i.e., the CPU 3) and a single non-volatile memory (i.e., the non-volatile memory 4C). Nevertheless, the MFP 1 may include a plurality of CPUs. Further, the MFP 1 may include one or more hardware circuits such as ASICs. The MFP 1 may include one or more hardware circuits and one or more CPUs.

As the document sheet M to be read by the MFP 1, various types of medium may be used such as cloths and films, as well as papers and transparencies (OHP sheets).

In the aforementioned illustrative embodiment, in S15, the CPU 3 lights all of the light sources 21L of RGB. Nevertheless, the CPU 3 may be configured to light one of the light sources 21L of RGB in S15.

In the aforementioned illustrative embodiment, the CPU 3 is configured to perform the black-reference-data determining process shown in FIGS. 4A and 4B, as a correction process to be executed in a process of manufacturing the MFP 1. Nevertheless, the CPU may be configured to perform the black-reference-data determining process shown in FIGS. 4A and 4B in response to determining that an operational mode of the MFP 1 has been switched to a predetermined mode such as a maintenance mode.

In the aforementioned illustrative embodiment, the ROM 4A is configured to store various computer-executable programs such as the program for executing the black-reference-data determining process and the program for executing the scanning process. Nevertheless, for instance, the program for executing the black-reference-data determining process may be stored in the non-volatile memory 4C at a factory shipment stage of the MFP 1.

In the aforementioned illustrative embodiment, the CPU 3 is configured to determine in S3 and S52 whether the requested operation (such as acquisition of black reference data and image reading) is to be performed in the color mode or the monochrome mode, and execute the subsequent steps based on the determination. Nevertheless, the CPU 3 may be configured to execute the subsequent steps based on determination as to whether the requested operation is to be performed with a resolution higher than a predetermined threshold. In this case, for example, when determining that the requested operation is to be performed with a resolution equal to or lower than the predetermined threshold, the CPU 3 may execute the same operations as when the requested operation is to be performed in the monochrome mode. Meanwhile, when determining that the requested operation is to be performed with a resolution higher than the predetermined threshold, the CPU 3 may execute the same operations as when the requested operation is to be performed in the color mode.

What is claimed is:

1. An image reader comprising:
   a light source configured to emit light onto an intended object;
   a sensor configured to receive reflected light from the intended object and generate an image signal by converting the received light into the image signal;
   a white reference member; and
   a controller configured to:
      supply a first power to the light source to emit first light of a first quantity onto a black reference member;
      receive a first image signal from the sensor, the first image signal being generated by the sensor by converting first reflected light from the black reference member, the first reflected light being from the black reference member when the light source emits the first light onto the black reference member;
      supply a second power to the light source to emit second light of a second quantity onto the white reference member, the second quantity being less than the first quantity, wherein the second power is determined based on a first output level of the first reflected light such that a second output level of a second reflected light is equivalent to the first output level, the second reflected light being from the white reference member when the light source emits the second light onto the white reference member;
      receive a second image signal from the sensor, the second image signal being generated by the sensor by converting the second reflected light from the white reference member when the light source emits the second light onto the white reference member;
      determine black reference data based on the received second image signal;
      supply the first power to the light source to emit the first light onto the white reference member;
      receive a third image signal from the sensor, the third image signal being generated by the sensor by converting third reflected light from the white reference member;
      determine white reference data based on the received third image signal;
      supply the first power to the light source to emit the first light onto a document sheet;
      receive a fourth image signal from the sensor, the fourth image signal being generated by the sensor by converting fourth reflected light from the document sheet when the light source emits the light onto the document sheet;
      generate image data of the document sheet based on the received fourth image signal; and
      correct the generated image data based on the determined white reference data and the determined black reference data.

2. The image reader according to claim 1, further comprising a storage device configured to store light source adjustment values, the light source adjustment values comprising:
   first adjustment values for the controller to control the light source to emit light of the first quantity; and
   second adjustment values for the controller to control the light source to emit light of the second quantity,
   wherein the first adjustment values comprise:
   a first current value of an electric current with which the controller controls the light source to emit light of the first quantity; and
   a first time period during which the controller controls the light source to emit light of the first quantity, and
   wherein the second adjustment values comprise:
   a second current value of an electric current with which the controller controls the light source to emit light of the second quantity, the second current value being adjusted lower than the first current value; and
   a second time period during which the controller controls the light source to emit light of the second quantity, the second time period being as long as the first time period.

3. The image reader according to claim 2,
   wherein the controller is configured to determine the black reference data by:
   determining and storing the second adjustment values into the storage device; and
   controlling the light source to emit light of the second quantity onto the white reference member during the second time period with the second current value, in accordance with the second adjustment values stored in the storage device.

4. The image reader according to claim 1, further comprising:
   a plurality of light emitting devices as the light source, the plurality of light emitting devices corresponding to a plurality of colors, respectively; and
   a storage device configured to store light source adjustment values, the light source adjustment values comprising:
   first adjustment values for adjusting a quantity of light to be emitted by each light emitting device when the controller determines the white reference data for each color; and
   second adjustment values for adjusting a quantity of light to be emitted by each light emitting device when the controller determines the black reference data, wherein the first adjustment values comprise:
a first current value of an electric current with which the controller lights each light emitting device when determining the white reference data; and
first time periods adjusted for the plurality of light emitting devices, respectively, the controller lighting each light emitting device during a corresponding one of the first time periods when determining the white reference data, and wherein the second adjustment values comprise:
a specific color of the plurality of colors, the controller lighting a specific light emitting device of the specific color when determining the black reference data;
a second current value of an electric current with which the controller lights the specific light emitting device when determining the black reference data, the second current value being adjusted lower than the first current value; and
a second time period during which the controller lights the specific light when determining the black reference data, the second time period being adjusted as long as a longest one of the first time periods.

5. The image reader according to claim 4,
wherein the controller is configured to determine the black reference data by:
determining and storing the second adjustment values into the storage device; and
controlling the specific light emitting device of the specific color to emit light onto the white reference member during the second time period as long as the longest one of the first time periods, with the second current value lower than the first current value, in accordance with the second adjustment values stored in the storage device.

6. The image reader according to claim 4,
wherein the specific light emitting device of the specific color needs to be supplied with an electric current of a highest current value among the plurality of light emitting devices, in order to achieve a predetermined output level of an image signal output from the sensor when the controller separately controls each light emitting device to emit light onto the white reference member during a time period as long as the second time period.

7. The image reader according to claim 4, wherein the controller is configured to:
determine, as a reference value, a maximum value of an image signal output from the sensor when the controller controls each light emitting device to emit light onto a black reference document in accordance with the first adjustment values; and
determine the second current value adjusted such that the determined reference value is identical to a maximum value of an image signal output from the sensor when the controller separately controls each light emitting device to emit light onto the white reference member with the second current value.

8. The image reader according to claim 1,
wherein pixel values of the black reference data are lower than pixel values of the white reference data.

9. The image reader according to claim 1,
wherein the black reference member comprises a black reference document.

10. A method adapted to be implemented on a processor coupled with a light source and a sensor, the method comprising:
supplying a first power the light source to emit first light of a first quantity onto a black reference member;
receiving a first image signal from the sensor, the first image signal being generated by the sensor by converting first reflected light from the black reference member, the first reflected light being from the black reference member when the light source emits the first light onto the black reference member;
supplying a second power to the light source to emit second light of a second quantity onto the white reference member, the second quantity being less than the first quantity, wherein the second power is determined based on a first output level of the first reflected light such that a second output level of a second reflected light is equivalent to the first output level, the second reflected light being from a white reference member when the light source emits the second light onto the white reference member;
receiving a second image signal from the sensor, the second image signal being generated by the sensor by converting the second reflected light from the white reference member when the light source emits the second light onto the white reference member;
determining black reference data based on the received second image signal;
supplying the first power to the light source to emit the first light onto the white reference member;
receiving a third image signal from the sensor, the third image signal being generated by the sensor by converting third reflected light from the white reference member when the light source emits the first light onto the white reference member;
determining white reference data based on the received third image signal;
supplying the first power to the light source to emit the first light onto a document sheet;
receiving a fourth image signal from the sensor, the fourth image signal being generated by the sensor by converting the fourth reflected light from the document sheet when the light source emits the first light onto the document sheet;
generating image data of the document sheet based on the received fourth image signal; and
correcting the generated image data based on the determined white reference data and the determined black reference data.

11. A non-transitory computer-readable medium storing computer-readable instructions that are executable by a processor coupled with a light source and a sensor, the instructions being configured to, when executed by the processor, cause the processor to:
supply a first power to the light source to emit first light of a first quantity onto a black reference member;
receive a first image signal from the sensor, the first image signal being generated by the sensor by converting first reflected light from the black reference member, the first reflected light being from the black reference member when the light source emits the first light onto the black reference member;
supply a second power to the light source to emit second light of a second quantity onto a white reference member, the second quantity being less than the first quantity, wherein the second power is determined based on a first output level of the first reflected light such that a second output level of a second reflected light is equivalent to the first output level, the second reflected light being from the white reference member when the light source emits the second light onto the white reference member;

receive a second image signal from the sensor, the second image signal being generated by the sensor by converting the second reflected light from the white reference member when the light source emits the second light onto the white reference member;

determine black reference data based on the received second image signal;

supply the first power to the light source to emit the first light onto the white reference member;

receive a third image signal from the sensor, the third image signal being generated by the sensor by converting third reflected light from the white reference member;

determine white reference data based on the received third image signal;

supply the first power to the light source to emit the first light onto a document sheet;

receive a fourth image signal from the sensor, the fourth image signal being generated by the sensor by converting fourth reflected light from the document sheet when the light source emits the light onto the document sheet;

generate image data of the document sheet based on the received fourth image signal; and correct the generated image data with the generated white reference data and the generated black reference data.

12. The non-transitory computer-readable medium according to claim 11,
wherein the processor is coupled with a storage device configured to store light source adjustment values, the light source adjustment values comprising:
first adjustment values for the controller to control the light source to emit light of the first quantity; and
second adjustment values for the controller to control the light source to emit light of the second quantity,
wherein the first adjustment values comprise:
a first current value of an electric current with which the controller controls the light source to emit light of the first quantity; and
a first time period during which the controller controls the light source to emit light of the first quantity, and
wherein the second adjustment values comprise:
a second current value of an electric current with which the controller controls the light source to emit light of the second quantity, the second current value being adjusted lower than the first current value; and
a second time period during which the controller controls the light source to emit light of the second quantity, the second time period being as long as the first time period.

13. The non-transitory computer-readable medium according to claim 12,
wherein the instructions are configured to, when executed by the processor, cause the processor to determine the black reference data by:
determining and storing the second adjustment values into the storage device; and
controlling the light source to emit light of the second quantity onto the white reference member during the second time period with the second current value, in accordance with the second adjustment values stored in the storage device.

14. The non-transitory computer-readable medium according to claim 11,
wherein the processor is coupled with:
a plurality of light emitting devices as the light source, the plurality of light emitting devices corresponding to a plurality of colors, respectively; and
a storage device configured to store light source adjustment values, the light source adjustment values comprising:
first adjustment values for adjusting a quantity of light to be emitted by each light emitting device when the controller determines the white reference data for each color; and
second adjustment values for adjusting a quantity of light to be emitted by each light emitting device when the controller determines the black reference data,
wherein the first adjustment values comprise:
a first current value of an electric current with which the controller lights each light emitting device when determining the white reference data; and
first time periods adjusted for the plurality of light emitting devices, respectively, the controller lighting each light emitting device during a corresponding one of the first time periods when determining the white reference data, and
wherein the second adjustment values comprise:
a specific color of the plurality of colors, the controller lighting a specific light emitting device of the specific color when determining the black reference data;
a second current value of an electric current with which the controller lights the specific light emitting device when determining the black reference data, the second current value being adjusted lower than the first current value; and
a second time period during which the controller lights the specific light when determining the black reference data, the second time period being adjusted as long as a longest one of the first time periods.

15. The non-transitory computer-readable medium according to claim 14,
wherein the instructions are configured to, when executed by the processor, cause the processor to determine the black reference data by:
determining and storing the second adjustment values into the storage device; and
controlling the specific light emitting device of the specific color to emit light onto the white reference member during the second time period as long as the longest one of the first time periods, with the second current value lower than the first current value, in accordance with the second adjustment values stored in the storage device.

16. The non-transitory computer-readable medium according to claim 14,
wherein the specific light emitting device of the specific color needs to be supplied with an electric current of a highest current value among the plurality of light emitting devices, in order to achieve a predetermined output level of an image signal output from the sensor when the controller separately controls each light emitting device to emit light onto the white reference member during a time period as long as the second time period.

17. The non-transitory computer-readable medium according to claim 14,
wherein the instructions are configured to, when executed by the processor, cause the processor to:
determine, as a reference value, a maximum value of an image signal output from the sensor when the controller controls each light emitting device to emit light onto a black reference document in accordance with the first adjustment values; and
determine the second current value adjusted such that the determined reference value is identical to a maximum value of an image signal output from the sensor when the controller separately controls each light emitting device to emit light onto the white reference member with the second current value.

18. The non-transitory computer-readable medium according to claim 11,
wherein pixel values of the black reference data are lower than pixel values of the white reference data.

19. The non-transitory computer-readable medium according to claim 11,
wherein the black reference member comprises a black reference document.

* * * * *